United States Patent
Myhre et al.

(10) Patent No.: US 11,163,157 B1
(45) Date of Patent: Nov. 2, 2021

(54) LIGHT FIELD HEAD-UP DISPLAY

(71) Applicant: Apple Inc., Cupertino, CA (US)

(72) Inventors: Graham B. Myhre, San Francisco, CA (US); Hyungryul J. Choi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 750 days.

(21) Appl. No.: 15/264,048

(22) Filed: Sep. 13, 2016

Related U.S. Application Data

(60) Provisional application No. 62/221,561, filed on Sep. 21, 2015.

(51) Int. Cl.
  *G02B 27/01* (2006.01)
  *G02B 27/00* (2006.01)
  *G09G 3/00* (2006.01)
  *G09G 3/34* (2006.01)
  *G02B 30/27* (2020.01)

(52) U.S. Cl.
  CPC ..... *G02B 27/0101* (2013.01); *G02B 27/0093* (2013.01); *G02B 30/27* (2020.01); *G09G 3/003* (2013.01); *G09G 3/3406* (2013.01); *G02B 2027/0118* (2013.01); *G02B 2027/0134* (2013.01); *G02B 2027/0147* (2013.01); *G09G 2380/10* (2013.01)

(58) Field of Classification Search
  CPC .................................................. G02B 27/0101
  See application file for complete search history.

(56) References Cited

U.S. PATENT DOCUMENTS

| | | | |
|---|---|---|---|
| 5,900,982 A | 5/1999 | Dolgoff et al. | |
| 7,703,924 B2 | 4/2010 | Nayar | |
| 2005/0280894 A1 | 12/2005 | Hartkop et al. | |
| 2006/0109202 A1 | 5/2006 | Alden | |
| 2010/0123839 A1* | 5/2010 | Lu ...................... | G02B 27/2264 349/15 |

(Continued)

OTHER PUBLICATIONS

Takaki, "Super multi-view display and its applications", Global 3D Tech Form 2014 Symposium, Institute of Engineering, Tokyo University of Agriculture and Technology, 38 pages.

(Continued)

*Primary Examiner* — Gustavo Polo
(74) *Attorney, Agent, or Firm* — Treyz Law Group, P.C.; G. Victor Treyz; Kendall W. Abbasi

(57) ABSTRACT

A vehicle may have a light-field head-up display that produces a light-field output allowing a viewer in the vehicle to observe three-dimensional content. An array of light-field display units and corresponding lenses may be used to direct the light-field output towards the viewer. The head-up display may have a transmissive display such as a liquid crystal display or other display with an array of backlit pixels. The pixels may have subpixels of different colors and may have elongated shapes extending along a given dimension. Lenticular lenses in the transmissive display that overlap the pixels may extend along the given dimension. A directional backlight may be used to adjust the direction of the light-field output produced by a light-field display unit. The directional backlight may be adjusted to alternately provide light-field output to the left and right eyes of a viewer.

10 Claims, 11 Drawing Sheets

(56) References Cited

U.S. PATENT DOCUMENTS

2010/0253917 A1  10/2010  Gao et al.

OTHER PUBLICATIONS

Takaki et al., "Super multi-view windshield display for long-distance image information presentation", Optics Express 704, vol. 19, No. 2, Jan. 17, 2011, Institute of Engineering, Tokyo University of Agriculture and Technology, 13 pages.

Owano, "Prototype uses multi-lens display for 3-D depth", Phys. org, Nov. 7, 2011, 3 pages. [Retrieved on Aug. 3, 2015]. Retrieved from the Internet<URL: http://phys.org/news/201111prototypemultilensddepthvideo.html>.

\* cited by examiner

LIGHT FIELD HEAD-UP DISPLAY

This application claims the benefit of U.S. provisional patent application No. 62/221,561, filed Sep. 21, 2015, which is hereby incorporated by reference herein in its entirety.

BACKGROUND

This relates generally to displays, and, more particularly, to head-up displays.

Vehicles such as automobiles are sometimes provided with head-up displays. Head-up displays project images onto the windshield of a vehicle. A driver of the vehicle can view the projected images while driving. Head-up displays are typically used to display vehicle status information such as speedometer information. Head-up displays allow information to be safely displayed for a driver without requiring the driver to look away from the road ahead.

To maximize the usefulness of head-up displays in vehicular environments, it would be desirable to be able to enhance the ability of a head-up display to display information for the occupants of a vehicle.

SUMMARY

A vehicle may have windows. A head-up display may produce output that reflects off of one of the windows towards a viewer such as a driver or other occupant in the vehicle. The head-up display may be a light-field head up display that produces a light-field output allowing the viewer to observe three-dimensional content on the head-up display.

An array of light-field display units and corresponding lenses may be used to direct the light-field output towards the viewer. The lenses may direct overlapping light-field output from the display units towards the viewer, thereby creating an enlarged seamless light-field viewing area on the window of the vehicle.

The head-up display may have a transmissive display such as a liquid crystal display or other display with an array of backlit pixels. The pixels may include subpixels of different colors. Each pixel may have an elongated shape and may extend along a given dimension. Lenticular lenses in the transmissive display that overlap the pixels may extend along the given dimension in parallel with the elongated pixels.

A directional backlight may be used to adjust the direction of the light-field output produced by the light-field display. The directional backlight may be adjusted to alternately provide light-field output to the left and right eyes of the viewer or to alternately provide the light-field output to two different viewers.

DETAILED DESCRIPTION

Systems such as vehicles and other systems may incorporate displays. As an example, a vehicle may have a head-up display that displays vehicle status information such as vehicle speed, direction, and location, fuel gauge information, battery charge level information, status information on vehicle operations such as headlight status, heating and air-conditioner status, seatbelt status, headlight status, media playback information (e.g., current radio station and track information), messages, alerts, and other information.

Figure 1:
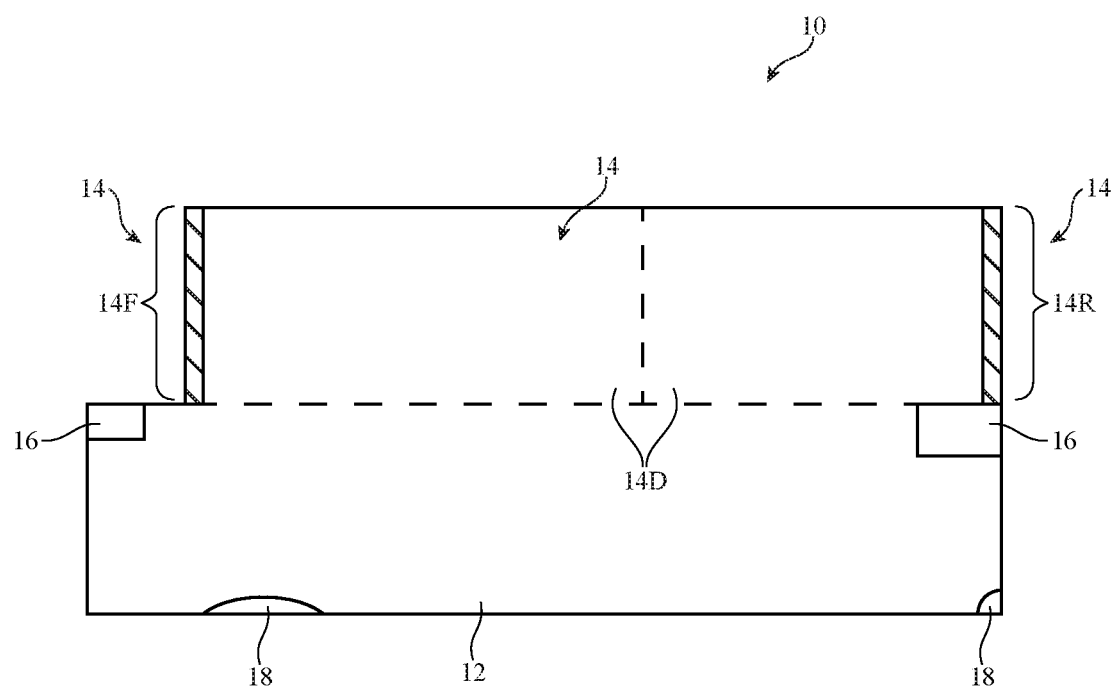
FIG. 1 is a side view of an illustrative vehicle with a head-up display in accordance with an embodiment.

A side view of an illustrative vehicle of the type that may be provided with a head-up display is shown in FIG. 1. As shown in FIG. 1, vehicle 10 may include a body such as body 12. Body 12 may have body panels and other structures that are mounted on a chassis. Interior components in vehicle 10 such as seating for a driver and other vehicle occupants may be supported by the chassis. External components such as wheels 18 may also be mounted to the chassis. The structures that make up body 12 may include metal structures, structures formed from fiber-composite materials such as carbon-fiber materials and fiberglass, plastic, and other materials. Vehicle 10 may include lights 16.

Vehicle body 12 may include doors. Windows 14 may be formed at the front and rear of vehicle 10 in openings in body 12 and may be formed within the doors or other portions of the body 12 of vehicle 10. As shown in FIG. 1, for example, vehicle 10 may have a front window such as front window 14F that faces the front of vehicle, rear facing windows such as rear window 14R, and side windows such as windows mounted within the doors of vehicle 10 (see, e.g., side windows 14D). Windows 14 may be formed from glass (e.g., glass laminated with polymer layers), plastics such as polycarbonate, or other clear materials.

There may be one or more head-up displays in vehicle 10. Each head-up display may display images by reflecting light off of the interior surface of a respective one of windows 14. To provide the driver of vehicle 10 with head-up display information, a head-up display may be used to reflect light from front window 14F. Head-up displays may also be associated with rear window 14R and side windows 14D. The driver and other occupants of vehicle 10 such as front and rear seat passengers may, if desired, be provided with head-up displays. Illustrative configurations in which a head-up display in vehicle 10 is associated with front window 14F are sometimes described herein as an example. If desired, head-up displays may be provided in other windows 14. The viewer of a head-up display may be a vehicle driver, front-seat passenger, or rear-seat passenger. Configurations in which the viewer of the head-up display is a driver may sometimes be described herein as an example.

Figure 2:
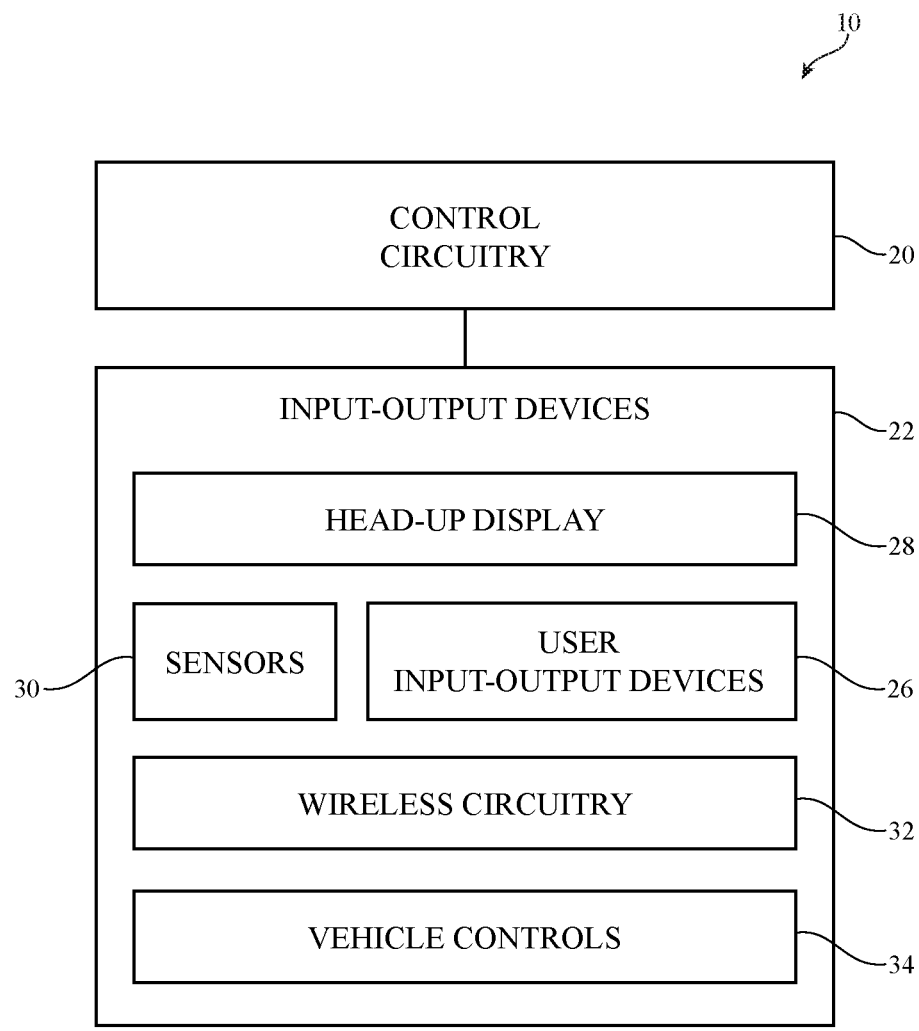
FIG. 2 is a schematic diagram of an illustrative vehicle or other system with a head-up display in accordance with an embodiment.

A schematic diagram of illustrative circuitry that may be used in operating vehicle 10 is shown in FIG. 2. As shown in FIG. 2, vehicle 10 may include control circuitry 20. Control circuitry 20 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 20 may be used to control the operation of device 10. The processing circuitry may be based on one or more microprocessors, microcontrollers, digital signal processors, baseband processors, power management units, audio chips, application specific integrated circuits, electronic control units, etc.

Vehicle 10 may include input-output devices 22 that allow data to be supplied to vehicle 10 and that allow data to be provided from vehicle 10 to external systems. Input-output devices 22 may include sensors 30 for gathering information on the operating environment of vehicle 10. Sensors 30 may include light-based sensors, wireless sensors such as radar sensors, ultrasonic sensors, proximity sensors, range-finding sensors, ambient light sensors, strain gauges, parking sensors, cruise control sensors, accelerometers, touch sensors, magnetic sensors such as electronic compass sensors, temperature sensors, rain sensors and other moisture sensors, force sensors, pressure sensors (e.g., altimeters), speedometers, odometers, tachometers, battery charge gauges, fuel gauges, circuits for determining the status of headlights and other lighting, seat belt sensors, door lock sensors, fuel door status, trunk status (open or closed), window status (up or down), and other components for making measurements on the environment surrounding vehicle 10 and the operating status of vehicle 10.

As shown in FIG. 2, input-output devices 22 may include user input-output devices 26. Devices 26 may be used to gather input from vehicle occupants and may be used in providing output to vehicle occupants. Devices 26 may include buttons, joysticks, steering wheels, shift levels and/or buttons, foot-actuated controllers (e.g., a throttle pedal, a brake pedal, a clutch pedal, etc.), touch pads, keypads, keyboards, motion sensors, microphones, cameras (digital image sensors), and other devices for gathering user input. Output devices in devices 26 may also include circuitry for generating audio output such as speakers, tone generators, and vibrators and circuitry for generating visible output.

Input-output devices 22 may include one or more displays for displaying visual information for a viewer (e.g., a driver or other vehicle occupant). For example, input-output devices 22 may include head-up display 28. Head-up display 28 may include a projector (e.g., a projector based on a micromirror array), liquid crystal display, organic light-emitting diode display, or other display unit for generating images for a viewer and an optical system for directing the images towards the viewer. The optical system may include a lens to project images from the display onto front window 14F so that the viewer (e.g., the driver of the vehicle) can view both head-up display content reflected from the front window and real-life objects that are visible through the front window.

Multiple display units and an associated array of lenses may be used to expand the viewable area of the head-up display. A camera (e.g., one or more digital image sensor integrated circuits and associated lens structures and/or one or more other light-based sensors or other sensors) may be used to track the position of the viewer's head and eyes. Using this tracking information, the viewing zone for the display (i.e., the head position region from which head-up display content is viewable) can be moved to accommodate movement of the viewer. A subset of the viewing zone that is aligned with the viewer's eyes may be provided with content while no content is being provided to portions of the viewing zone that are not being actively used, thereby reducing the display content processing burden on the head-up display. Display resolution may be enhanced by using time-division multiplexing schemes and directional backlights to direct the output of the head-up display alternately into subsets of the viewing zone that are aligned respectively with the left and right eyes of the viewer.

Wireless circuitry 32 may include radio-frequency transceiver circuitry and antennas for transmitting and receiving wireless signals. The signals may include, for example, short-range signals such as wireless local area network signals (WiFi® and Bluetooth® signals) and long-range signals (e.g., cellular telephone signals and other signals at frequencies of 700 MHz to 2700 MHz and/or other suitable frequencies). Wireless information may be shared with nearby vehicles, sensors and beacons embedded along a roadway, satellites, cellular telephone networks, cellular telephones, wristwatches, and other wireless devices associated with a driver and passengers in vehicle 10, etc. Wireless information that is received by circuitry 32 may include traffic information, weather information, information on the status of nearby vehicles (e.g., direction of motion, acceleration/deceleration, brake status (braking due to application of brakes by a driver or not braking), throttle status (applied or not applied), temperature information, road condition information (as measured by sensors in vehicles and/or external sensors), etc.

Vehicle controls 34 may include control circuitry, actuators, and other systems for controlling vehicle operation. Vehicle controls 34 may include systems for steering, braking (manual brakes, emergency brakes, power-assisted brakes, drum brakes, disc brakes, regenerative brakes that use drive motors or other systems to recover energy and convert the kinetic energy of vehicle 10 into electrical energy stored in capacitors and/or batteries or that use other techniques for storing recovered energy, or other braking systems), accelerating, shifting gears, adjusting interior and exterior lights, adjusting infotainment functions, controlling satellite navigation system operation, adjusting airbags, seatbelts, and other safety devices, controlling audio output, controlling electronic windows, door locks, the opening and closing of doors and hatches, windshield wipers, defrosters, and other climate controls, and systems for controlling and adjusting other operations during the operating of vehicle 10.

Using information from sensors 30, user input and other input from devices 26, and/or information received wirelessly from remote sources via wireless circuitry 32, vehicle 10 may determine actions to take in supplying output and otherwise controlling the operation of vehicle 10. As an example, control circuitry 20 may determine that head-up display 28 should display vehicle status information to a viewer. The vehicle status information may include odometer information, speedometer information, tachometer information, fuel gauge or battery charge gauge information, seatbelt status information, headlight status information, fuel door status, information on the status of doors and windows in vehicle 10, and other vehicle operating status information. Control circuitry 20 may also display augmented reality information on display 28 for the viewer. For example, a warning sign may be placed in the field of view of the driver of vehicle 10 to alert the driver when a potential obstruction in the road is detected, to inform the driver when another vehicle is approaching vehicle 10 on a collision course, to inform the driver of poor upcoming road conditions or weather, etc. Augmented reality information may also include highlight regions to help a driver identify pedestrians or unexpected driving conditions. Public service announcements, driving tips, navigation information (maps, driving directions, points of interest, etc.) and other information may also be displayed.

If desired, head-up display 28 may be a light-field head up display. By producing a light field with specified light ray angular orientations as well as specified light ray intensities, the light-field head-up display can create an impression of three-dimensionality and depth in displayed content. As with a real-life three-dimensional object, the appearance of displayed content will vary as the position of the viewer shifts within vehicle 10. In configurations in which head-up display 28 is a light field display having three-dimensional display capabilities, the head-up content that is displayed may have the appearance of being located within the environment surrounding vehicle 10. For example, a highlight region for helping a driver identify the location of a pedestrian may appear to surround the pedestrian, an icon alerting the driver to a pothole or other road obstruction may visually appear to be a three-dimensional object located adjacent to the pothole, etc.

Figure 3:
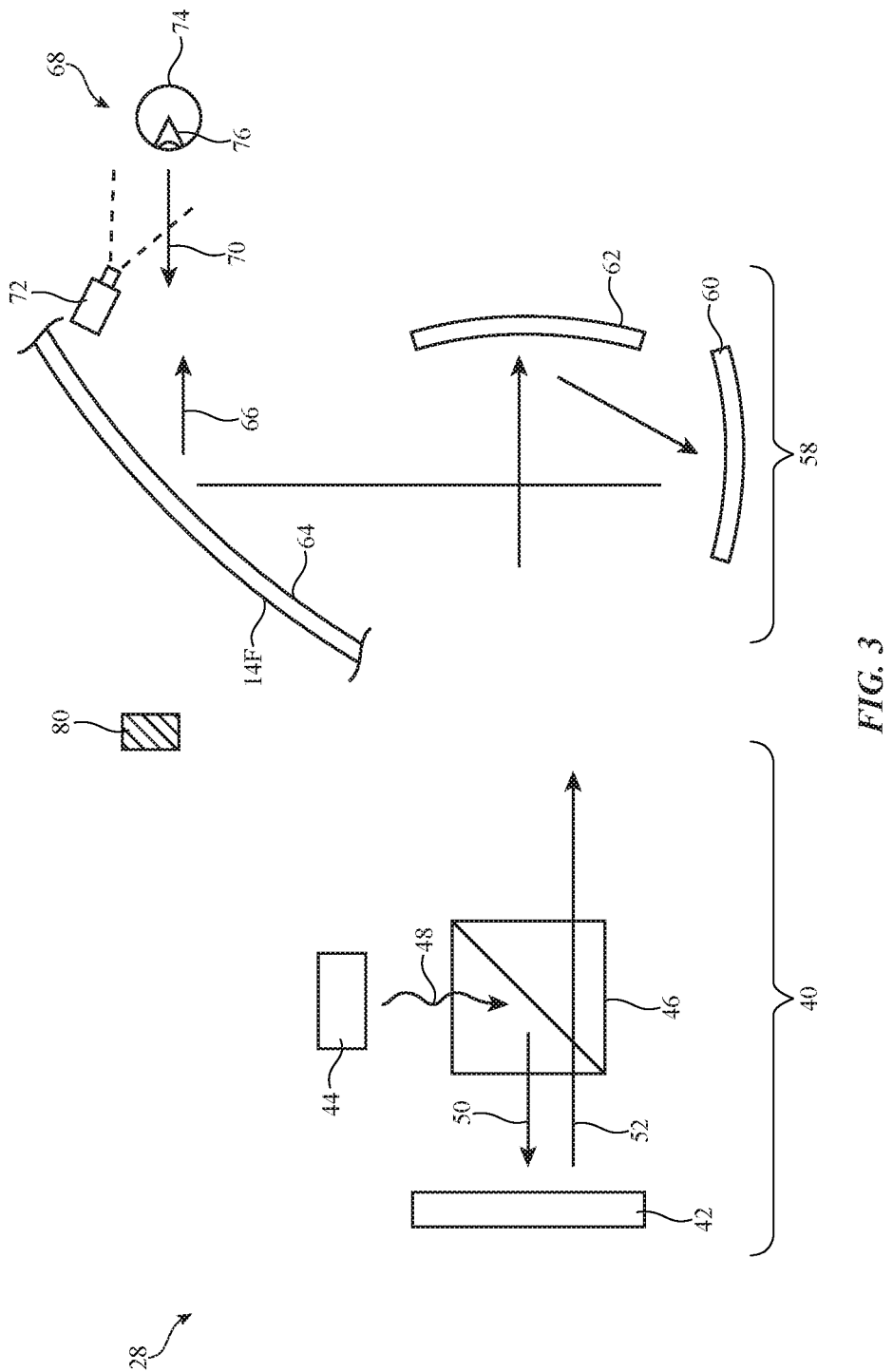
FIG. 3 is a side view of an illustrative head-up display in a vehicle in accordance with an embodiment.

A side view an illustrative head-up display is shown in FIG. 3. As shown in FIG. 3, head-up display 28 may include one or more display units such as display unit 40 and one or more lenses forming an optical system such as optical system 58. Display unit 40 may be a light-field display unit based on a liquid crystal display, organic light-emitting diode display, cathode ray tube, plasma display, projector display (e.g., a projector based on an array of micromirrors), or other suitable type of display. Light-field display unit 40 may generate a light-field associated with three-dimensional content to be displayed to viewer 68. Optical system 58 may be used to present the light-field output from light-field display unit to viewer 68. For example, optical system 58 may direct light-field output from display unit 40 to inner surface 64 of front window 14F (or other suitable windows in vehicle 10). Reflected light 66 may be viewed by a viewer such as viewer 68 who is looking through window 14F in direction 70. Viewer 68 may simultaneously view content from display unit 40 and objects external to vehicle 10 such as external object 80 by looking in direction 70.

A digital image sensor or other sensor(s) such as camera 72 may be used to track the position of the viewer's head (head 74) and/or the viewer's eyes (eyes 76). Viewer tracking information may be used to restrict the amount of light-field output that is generated (e.g., so that only information that is viewable by viewer 68 is generated by display unit 40). Restricting the amount of light-field output that is generated may reduce the processing burden placed on control circuitry 20 when creating three-dimensional display output with head-up display 28.

In the illustrative configuration of FIG. 3, light-field display unit 40 is a projector-based system that includes a light source such as light source 44 that produces light 48. Light 48 is reflected from beamsplitter 46 as reflected light 50. Reflected light 50 is directed towards the face of micromirror array 42. Light 50 reflects from micromirror array 42 as light-field output 52. The direction and intensity of the light rays in light-field output 52 are modulated by micromirror array 42 to produce a desired light field. The light field output of light-field display unit 40 (output 52) is provided to optical system 58. Optical system 58 may include lenses such as mirror lenses 60 and 62 or other suitable optical components that direct light-field output 52 onto inner surface 64 of window 14F.

Window 14F is partially reflective, so a portion of the light that is directed toward surface 64 by optical system 58 reflects toward viewer 68 as reflected light-field output 66. If desired, the optical properties of window 14F (e.g., the curvature of window 14F) may be taken into account when configuring lenses 62 and 60, so the reflective surface of window 14F may be considered to be part of optical system 58. Optical system 58 of FIG. 3 has multiple lenses that together form a multi-element lens. If desired, optical system 58 may contain an array of lenses each of which contains multiple mirror lens elements such as mirror lenses 60 and 62. Each of the lenses in the array of lenses may contain two lens elements (e.g., each lens in the array may be a multi-element lens containing two or more lens elements such as lens elements 60 and 62 of FIG. 3) or each of the lenses in the array of lenses may be a single-element lens. The use of an array of lenses may help extend the area of head-up display 28 that is viewable by viewer 68 without making head-up display 28 excessively large (i.e., excessively deep).

Figure 4:
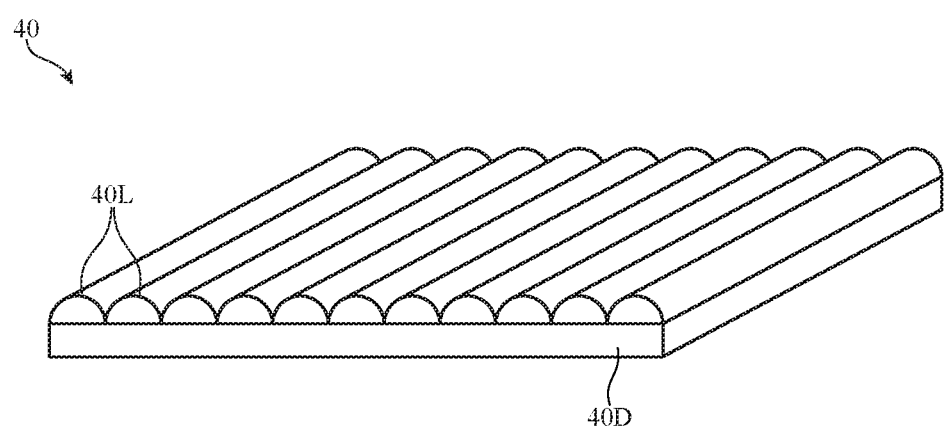
FIG. 4 is a perspective view of a display with a lenticular lens array for use in a light field head up display in accordance with an embodiment.

If desired, display unit 40 may contain a flat panel display structure such as illustrative flat-panel light-field display 40D of FIG. 4. Display 40D may be a liquid crystal display (e.g., a backlight liquid crystal display), an organic light-emitting diode display, or other suitable display. Display 40D may have an array of pixels for generating output light. Lens structures such as elongated lenticular lenses 40L of FIG. 4 may be formed on the surface of display 40D. Lenticular lenses 40L may have curved (e.g., semicircular) profiles and may extend parallel to each other along one of the lateral dimensions of display 28D.

As shown in the cross-sectional side view of illustrative flat-panel light-field display 40D of FIG. 4, each lens 28L may overlap multiple pixels 40P in the array of pixels of display 40D (i.e., multiple pixels 40P extending in a dimension perpendicular to the longitudinal axis of lens 28L). By selecting appropriate pixels 40P, both the intensity I and angle A (with respect to display surface normal n) of emitted light rays such as light ray 52' may be controlled. During operation, a pattern of pixels 40P may therefore be illuminated to create a desired light field at the output of display 40D. Because the light field includes angle-controlled and intensity controlled light rays, three-dimensional content may be displayed for viewer 68. Any suitable number of pixels 40P may extend across the width of each lens 28L (e.g., 30 pixels 40P in a scenario in which display 40 is capable of presenting 30 different views to a viewer, more than 30 pixels, or fewer than 30 pixels).

Figure 5:
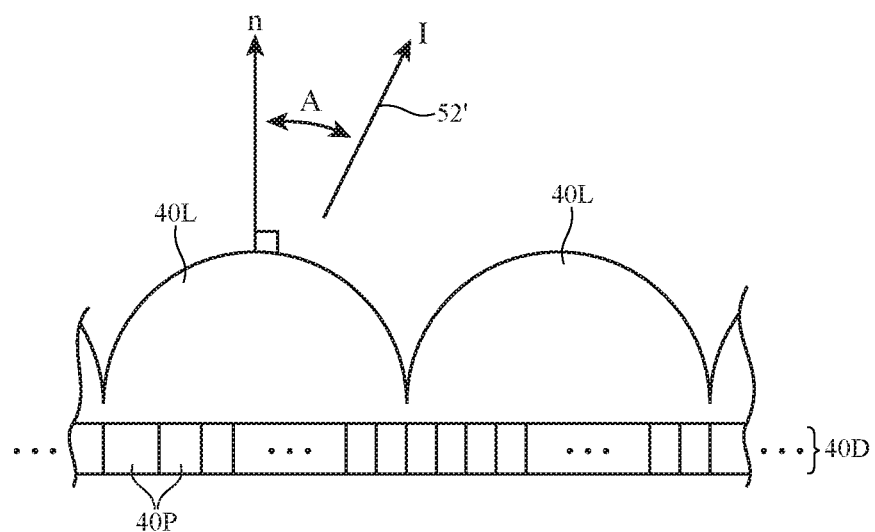
FIG. 5 is a cross-sectional side view of a portion of the display of FIG. 4 in accordance with an embodiment.

In configurations of the type shown in FIGS. 4 and 5 in which lenticular lenses 40L are provided on display 40D, the displayed content may exhibit three-dimensionality as the viewer moves back and forth horizontally, but will not exhibit three-dimensional behavior in the vertical dimension. If desired, a two-dimensional array of microlenses (e.g., circular microlenses) may be used in place of lenticular lenses 40L to allow display unit 40 to produce a light field that supports three dimensionality in both horizontal and vertical directions. When an array of microlenses is used, each microlens may overlap a respective two-dimensional array of pixels 40P. The illustrative arrangement of FIGS. 4 and 5 allows a relatively high resolution to be maintained for displayed content while minimizing the number of pixels 40P.

Another way in which to maintain a high resolution without requiring an excessive number of pixels 40P in display 40D involves restricting the size of the region in which light field output 52 is viewable. This region, which may sometimes be referred to as the viewing box or viewing region for display 28, may be about 150 mm in width (e.g. the size of a viewer's head) or other suitable size. Control circuitry 20 may use camera 72 to track the position of head 74 and/or eyes 76 of viewer 68. As the viewer's position shifts within vehicle 10, the output of display 28 may be adjusted so that the direction of output light 52 is adjusted and the location of the viewing box shifts accordingly. In this way, the viewer's head and eyes may remain centered within the viewing box, even as the position of the viewer's head and eyes moves.

Figure 6:
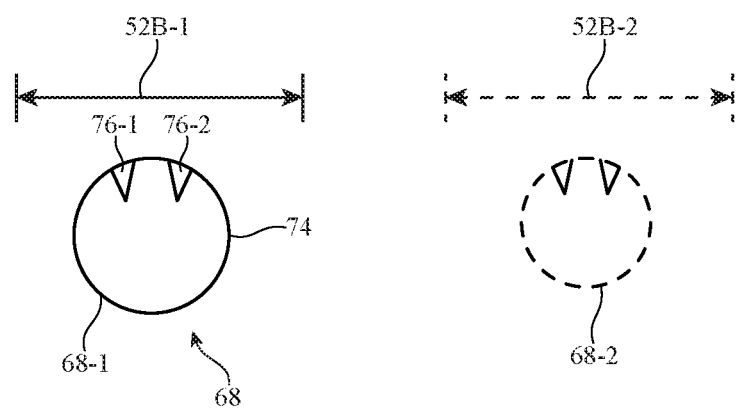
FIG. 6 is a top view of an illustrative viewer and an associated viewing region produced by a light field head-up display in accordance with an embodiment.

FIG. 6 shows how viewer 68 may initially be positioned in location 68-1 in alignment with viewing box 52B-1 (i.e., light-field output 52 is directed towards the viewing region associated with box 52-1). In this position, the viewer's left eye 76-1 and right eye 76-2 both receive light-field output 52 in viewing box 52B-1, because viewing box 52B-1 overlaps left eye 76-1 and right eye 76-2. As viewer 68 moves to position 68-2, head-up display 28 may steer light-field output 52 so that the viewing box moves to position 52B-2 (e.g., light-field 52 may be steered using a directional backlight). This type of arrangement avoids the need to create an overly large viewing box (which would require a larger display and/or lowered display resolution).

Figure 7:
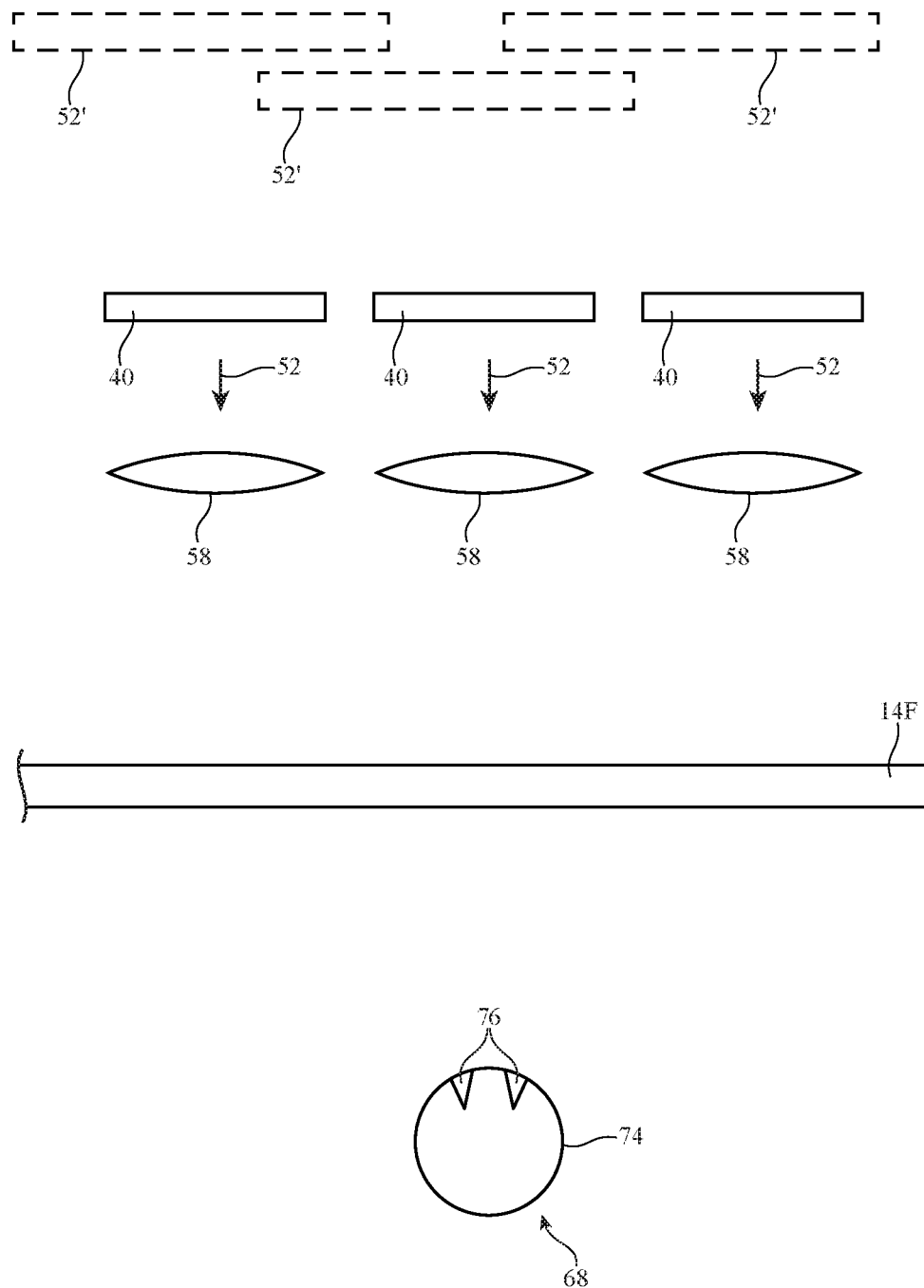
FIG. 7 is a top view of an illustrative head-up display with an array of lenses in accordance with an embodiment.

The viewable area of display 28 may also be extended by using an array of lenses (i.e., an array of multi-element lenses such as lens 58 of FIG. 3 or other suitable lenses) and an array of associated light-field display units 40 to present light field output 52 to viewer 68. Each lens 58 may direct a light-field output from a respective light-field display unit 40 to the viewer in an overlapping fashion that creates a seamless enlarged viewing area. As shown in FIG. 7, multiple lenses 58 may be organized in a one-dimensional array (e.g., an array extending horizontally in front of viewer 68 in the example of FIG. 7). Each lens 58 may be used to direct light-field output 52 from a respective one of light-field display units 40 to viewer 68 from a different respective light-field display 14. Lenses 58 may be arranged so that the viewer's views of outputs 52 (virtual images 52' of FIG. 7) overlap and create seamless three-dimensional content over an extended head-up display area (e.g., lenses 58 may each be located less than a focal length away from a respective display unit 40, so that the virtual image 52' of each display unit 40 is larger than that display unit 40).

Figure 8:
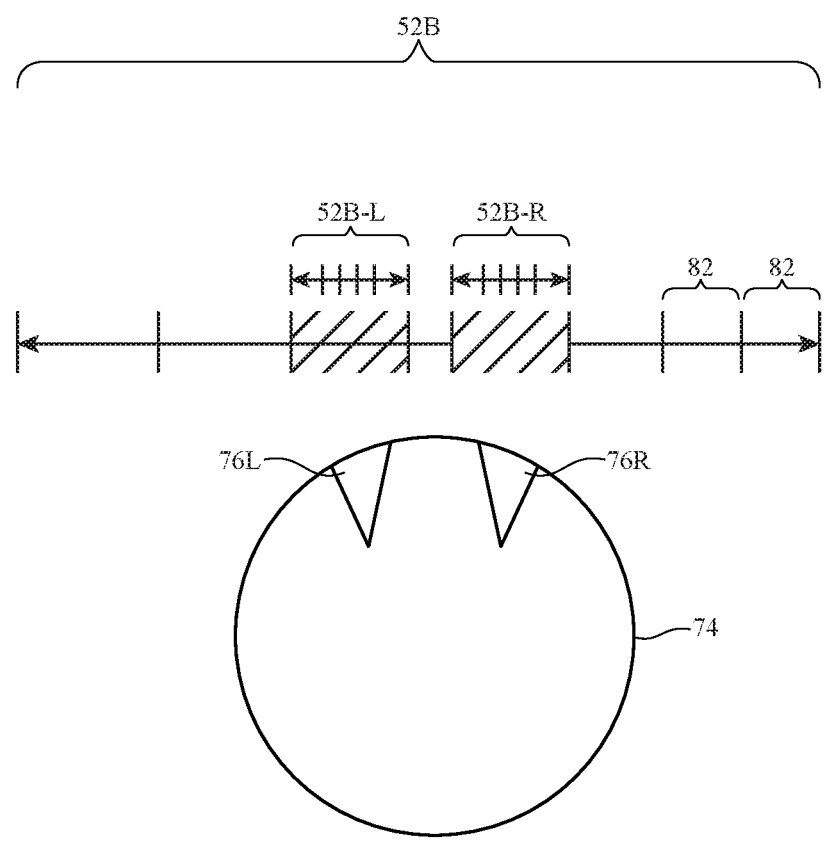
FIG. 8 is a top view of an illustrative viewer and an associated head-up display viewing region (viewing box) having subregions aligned with the left and right eyes of the viewer in accordance with an embodiment.

Display processing operations may be minimized by restricting light-field output 52 to subregions of viewing box 52B that overlap the eyes of the viewer. As shown in FIG. 8, viewing box 52B may contain multiple subregions 82. Control circuitry 20 may direct display unit 40 to produce light-field output 52 that illuminates only those subregions 82 that overlap the eyes of the viewer. For example, light-field output 52 may be generated by display unit 40 that covers only subregion 52B-L and subregion 52B-R and not adjacent areas. The light-field output in subregion 52B-L may overlap left eye 76L and the light-field output in subregion 52B-R may overlap right eye 76R. Each light-field subregion in viewing box 52B contains multiple views (e.g., 5 views, 15 views, 30 views, or other suitable number of views), but because the size of subregions 52B-L and 52B-R is only a subset of box 52B, less light-field output needs to be generated and display processing operations are reduced accordingly.

Further reductions in display processing requirements may be obtained by using time-division multiplexing to alternate between the left and right eyes of viewer 68 (or between different occupants of vehicle 10). During odd time periods, for example, display 28 may produce light in viewing region 52B-L, but not in region 52B-R (or any other location overlapping viewer 68). During even time periods, the output of display 28 may be adjusted so that light is only produced in viewing region 52B-R and not elsewhere in box 52B. The rate at which output 52 alternates between region 52B-L and 52B-R may be selected to be faster than the response time of a human eye (e.g., 200 Hz or other suitable relatively fast frequency). As a result, viewer 68 will perceive constant flicker-free content in both eyes, even though display 28 is alternately producing content for left eye 76L and right eye 76R.

Output 52 may be directed into subregions of viewing box 52B and may be caused to alternate between the viewer's left and right eyes using any suitable light-field output steering arrangement (e.g., an adjustable array of micromirrors, etc.). With one suitable arrangement, light-field display 40 may contain a transmissive display illuminated by a directional backlight with at least two different directional settings. The direction of the backlight illumination produced by the directional backlight and therefore the direction of light-field output 52 from display 40 may be adjusted by alternating the directional backlight between the two directional settings.

Figure 9:
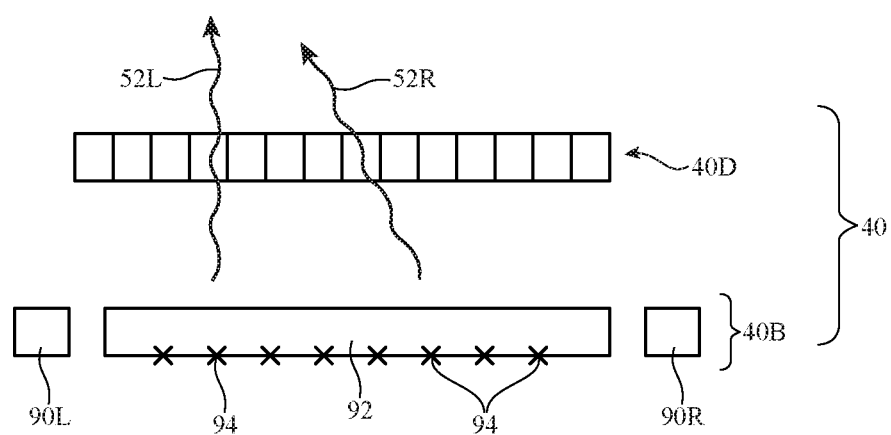
FIGS. 9 and 10 are diagrams of illustrative directional backlights that may be used in head-up displays in accordance with an embodiment.

A configuration for light-field display 40 with an illustrative directional backlight unit that is based on a light guide structure is shown in FIG. 9. As shown in FIG. 9, directional backlight unit 40B may include a light guide structure such as light guide structure 92. Light guide structure 92 may be formed from clear plastic or other suitable material. Light may be emitted into the edges of light guide structure 92 by arrays of light-emitting diodes or other suitable light sources. The light-emitting diodes may include light-emitting diodes 90L on the left of light guide structure 92 of FIG. 9 and light-emitting diodes 90R on the right of light guide structure 92 of FIG. 9 (as an example). Protrusions, depressions, and/or other light-scattering structures 94 may be formed in light guide structure 92. When a first light source such as an array of light-emitting diodes 90L is used to emit light into light guide structure 92, backlight is produced that travels through transmissive light-field display 40D (e.g., a liquid crystal display) in direction 52L. When a second light source such as an array of light-emitting diodes 90R is used to emit light into light guide structure 92, backlight is produced that travels through light-field display 40D at a different direction (see, e.g., light 52R, which travels at a non-zero angle with respect to light 52L). The ability to alternate backlight unit 40B between a first setting (light source 90L activated and light source 90R deactivated) and a second setting (light source 90L deactivated and light source 90R activated) to steer the backlight illumination produced by backlight unit 40B allows light-field output 52 from light-field display 40 to be steered (e.g., to track head movements and/or to alternate between eyes 76L and 76R or other locations).

Figure 10:
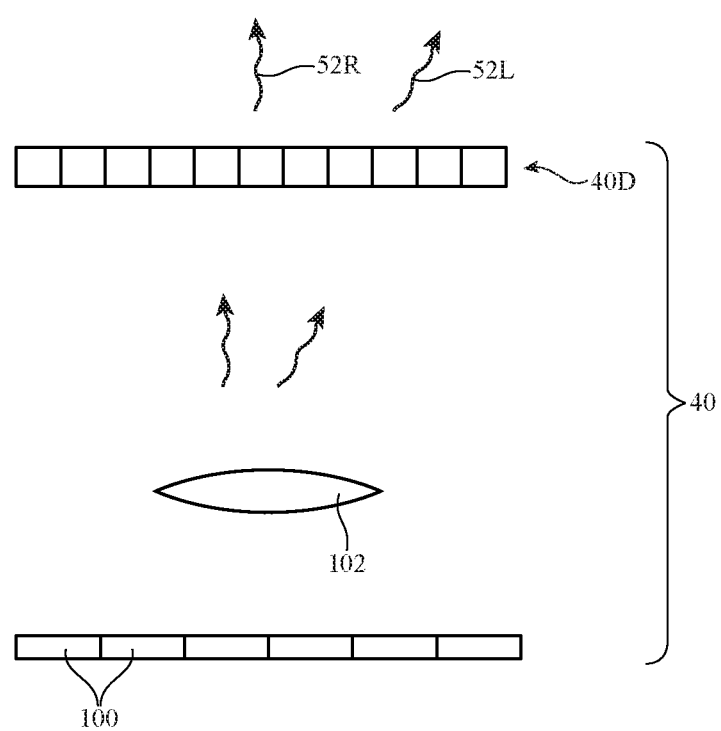

In the illustrative configuration of FIG. 10, directional backlight unit 40B includes an array of light-generating elements 100 (e.g., light-emitting diodes, etc.). Backlight unit 40B may provide backlight illumination for transmissive light-field display 40D (e.g., a liquid crystal display). Lens 102 (e.g., an optical system with one or more lens elements) may be used to direct light from light-generating elements 100 through transmissive light-field display 40D.

By controlling which of light-generating elements 100 are activated, the light emitted from elements 100 and therefore the direction of light-field output from display 40D may be steered (see, e.g., light-field output 52R, which is directed in a first direction, and light-field output 52L, which is directed in a second direction that different from the first direction).

It may be desirable to produce color images with display 28. Color images may be produced by including colored pixels 40P in light-field display 40D. Colored pixels 40P may include red subpixels, green subpixels, and blue subpixels or may include subpixels of other colors. In a light-emitting diode display, each pixel may have light-emitting diode subpixels that emit light of different colors. In a liquid crystal display, each subpixel may be associated with a color filter element of a different color (e.g., red, green, and blue color filter elements or color filter elements of other suitable colors). Other types of displays may use other types of colored subpixel elements. The use of light-emitting diodes of different colors in the subpixels of a light-emitting diode display and the use of color filter elements of different colors in the subpixels of a liquid crystal display in light-field display 40D is merely illustrative.

Figure 11:
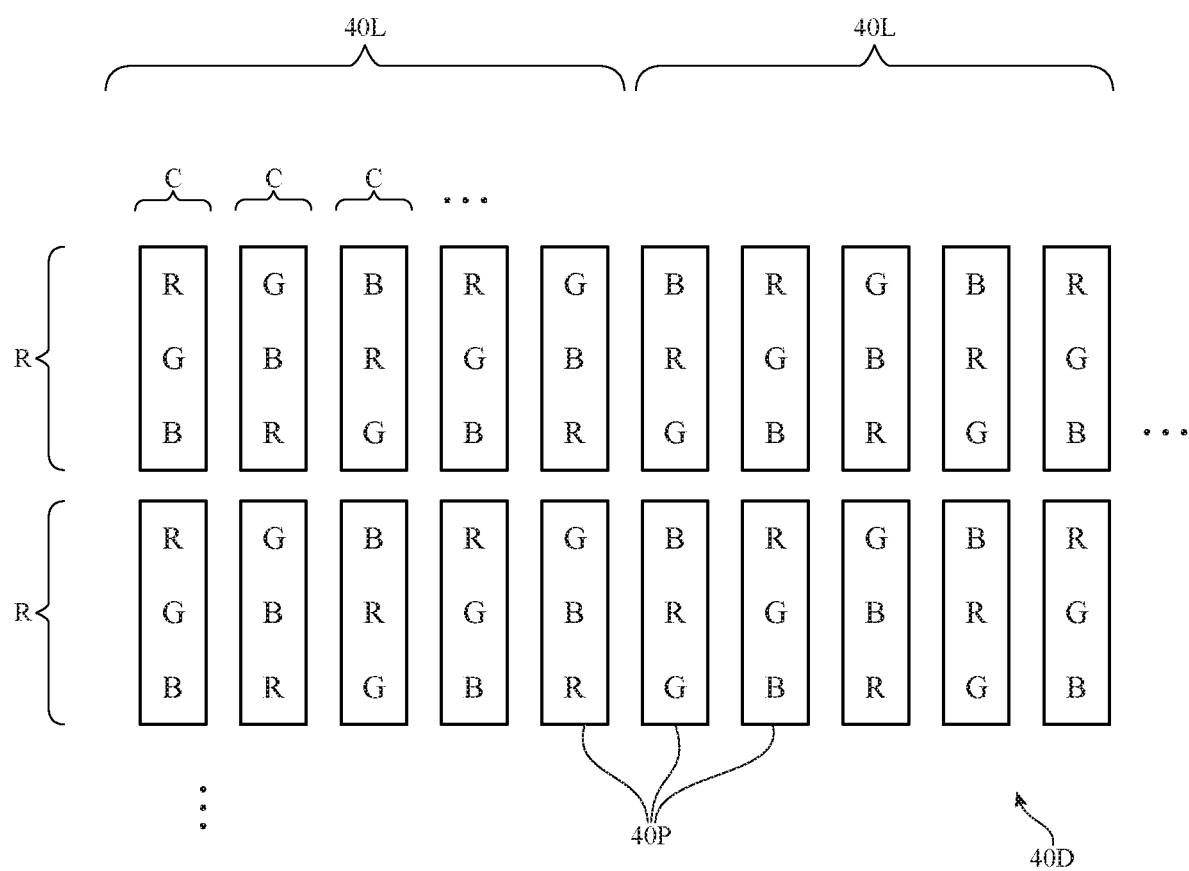
FIG. 11 is a top view of an illustrative array of pixels for a light-field display unit in a head-up display in accordance with an embodiment.

A top view of light-field display 40D showing an illustrative layout scheme that may be used for the array of pixels 40P is shown in FIG. 11. As shown in FIG. 11, display 40D may have an array of pixels 40P organized in multiple rows R and columns C. Each lenticular lens 40L overlaps a respective set of columns C (e.g., 30 columns, more than 30 columns, fewer than 30 columns, etc.). In the example of FIG. 11, each lens 40L overlaps five columns C and numerous rows R. The pixels 40P of each column C under a given lens 40L may be used to produce a different view in light-field output 52.

Each of pixels 40P may contain a red subpixel R, green subpixel G, and blue subpixel B. Pixels 40P may have elongated shapes that extend vertically along columns C. As a result, the red, green, and blue subpixels of each pixel 40P in a given column are available for creating light output for the view associated with the given column, thereby maximizing display resolution.

The foregoing is merely illustrative and various modifications can be made to the described embodiments. The foregoing embodiments may be implemented individually or in any combination.

What is claimed is:

1. A light-field head-up display that reflects light-field output off of a window in a vehicle towards a viewer at a viewer position in the vehicle, comprising:
    a light-field display unit that produces light-field output, wherein the light-field display unit has a transmissive display with an array of pixels and has a directional backlight that produces backlight in different directions in accordance with different respective settings; and
    an optical system that provides the light-field output from the light-field display unit to the window of the vehicle so that the light-field output reflects towards the viewer position.

2. The light-field head-up display defined in claim 1 wherein the light-field head-up display directs the light-field output in a first direction when the directional backlight is operated with a first of the settings and in a second direction that is different than the first direction when the directional backlight is operated with a second of the settings.

3. The light-field head-up display defined in claim 2 wherein the viewer has left and right eyes at respective left and right eye positions and wherein the light-field output is directed towards a region that overlaps the left eye position and not the right eye position when the directional backlight is operated with the first of the settings and a region that overlaps the right eye position and not the left eye position when the directional backlight is operated with the second of the settings.

4. The light-field head-up display defined in claim 3 wherein the light-field display unit comprises lenses each of which overlaps a different respective set of the pixels.

5. The light-field head-up display defined in claim 4 wherein the array of pixels includes rows and columns of pixels extending respectively along each of two perpendicular dimensions, wherein the pixels in the array of pixels each include red, green and blue subpixels, wherein each pixel has an elongated shape that extends along a given one of the two perpendicular dimensions, and wherein the lenses comprise elongated lenticular lenses that extend along the given one of the two perpendicular dimensions.

6. The light-field head-up display defined in claim 1 wherein the light-field display unit comprises lenticular lenses that overlap respective sets of the pixels.

7. The light-field head-up display defined in claim 1 wherein the optical system comprises mirror lenses.

8. A light-field head-up display that reflects light-field output off of a window in a vehicle towards a viewer at a viewer position in the vehicle, comprising:
    a light-field display unit that produces light-field output, wherein the light-field display unit has a transmissive display unit with an array of pixels overlapped by lenticular lenses and has a directional backlight that is adjustable to produce backlight illumination for the transmissive display unit in different directions; and
    an optical system that provides the light-field output from the light-field display to the window of the vehicle so that the light-field output reflects towards the viewer position.

9. The light-field head-up display defined in claim 8 wherein the array of pixels includes rows and columns of pixels extending respectively along each of two perpendicular dimensions, wherein the pixels in the array of pixels each include red, green and blue subpixels, wherein each pixel has an elongated shape that extends along a given of the two perpendicular dimensions, and wherein the lenticular lenses extend along the given one of the two perpendicular dimensions.

10. The light-field head-up display defined in claim 9 wherein the directional backlight is alternately operated to produce backlight illumination in a first of the different directions and a second of the different directions.

\* \* \* \* \*